United States Patent [19]

Harupa

[11] 4,226,227
[45] Oct. 7, 1980

[54] SOLAR COLLECTOR

[75] Inventor: Gerhard Harupa, Aachen, Fed. Rep. of Germany

[73] Assignee: U.S. Philips Corporation, New York, N.Y.

[21] Appl. No.: 897,736

[22] Filed: Apr. 19, 1978

[30] Foreign Application Priority Data

Jun. 11, 1977 [DE] Fed. Rep. of Germany ....... 2726457

[51] Int. Cl.² .............................................. F24J 3/02
[52] U.S. Cl. .................................. 126/442; 126/448; 126/901
[58] Field of Search ............... 126/270, 271, 442, 443, 126/448, 901; 237/1 A

[56] References Cited

U.S. PATENT DOCUMENTS

| 3,052,228 | 9/1962 | Okuda | 126/271 |
| 4,103,673 | 8/1978 | Woodworth et al. | 126/271 |
| 4,142,511 | 3/1979 | Doughty et al. | 126/271 |
| 4,153,041 | 5/1979 | Grauleau et al. | 126/271 |

Primary Examiner—James C. Yeung
Attorney, Agent, or Firm—Thomas A. Briody; William J. Streeter; Rolf E. Schneider

[57] ABSTRACT

There is provided a solar collector including a sealed and evacuated transparent cover tube that forms a wall of a heating duct through which a heat transport medium is fed during operation. Special connections are provided at the ends of the heating duct for the introduction of the heat transport medium thereinto and the discharge of the same therefrom.

4 Claims, 5 Drawing Figures

SOLAR COLLECTOR

This invention relates to a solar collector, comprising at least one heat exchanger having a front wall and a rear wall wherebetween a duct is formed, an absorber which cooperates with the front wall and which serves to transfer heat obtained from solar radiation incident on the absorber during operation, to a heat transport medium which is conducted through the duct, and also comprising a sealed and evacuated transparent cover tube which contacts the absorber and which thermally insulates the heat exchanger and the absorber from the ambient atmosphere.

In a solar collector of the described kind, disclosed in U.S. patent application Ser. No. 783,944 filed Apr. 1, 1977, now U.S. Pat. No. 4,144,875. The cover tube rests in the dale formed by the curved front wall of the heat exchanger. The front wall then consists, for example, of a metal foil or a synthetic material.

The cover tube is secured to the front wall by means of an adhesive.

The absorber may be provided in the form of a layer on the inner surface of the part of the cover tube which faces the heat exchanger.

A construction of this kind has the drawback in that the transfer of heat from the absorbing layer to the heat transport medium in the duct is seriously obstructed by interruption of mechanical contact on the basis of the difference in thermal expansion of the cover tube, which often consists of glass, and the front wall of the heat exchanger, which is usually made of metal.

Moreover, replacement of a damaged cover tube is problematic.

The present invention has for its object to provide an improved solar collector of the described kind in which the described drawbacks are eliminated in a structurally simple manner.

In order to realize this object, the solar collector in accordance with the invention is characterized in that the front wall of the heat exchanger is formed by a part of the cover tube which is connected to the rear wall in a sealing manner at the area of the upright longitudinal edges of this rear wall.

It is thus ensured that part of the cover tube is also an integral part of the heat exchanger. The heat transport medium in the duct, for example, water, is now in direct contact with the cover tube, without a partition therebetween.

A solar collector of this kind can be simply and inexpensively manufactured and removed.

A preferred embodiment of the solar collector in accordance with the invention is characterized in that the absorber is provided in the form of a layer on the outer surface of the cover tube part.

This offers the advantage that the heat transport medium is in direct contact with the absorber giving off heat.

The absorbing layer may be selective, i.e. it may have an absorption factor $\alpha \geq 0.85$ for solar radiation ($\lambda = 0.3$ to 2 microns) and an emission factor $\epsilon < 0.15$ for heat radiation ($\lambda = 3$ to 30 microns).

In order to achieve even more efficient operation of the solar collector in accordance with the invention, the cover tube may be provided on its inner surface with a light-transmitting but heat-reflective layer, for example, of tin dioxide or tin-doped indium oxide.

A further preferred embodiment of the solar collector in accordance with the invention is characterized in that the rear wall of the heat exchanger is provided, in the vicinity of the cover tube ends, with connection sleeves which project into connection tubes of inlet and outlet ducts for the heat transport medium.

This enables simple replacement of the heat exchanger.

In a still further preferred embodiment of the solar collector in accordance with the invention, the connection tubes are provided with non-return valves which close the connection tubes when the heat exchanger is removed.

It is thus prevented that heat transport medium can freely flow from the ducts upon removal of the heat exchanger.

The invention will now be described in greater detail in connection with the accompanying drawing in which.

Figure 1:
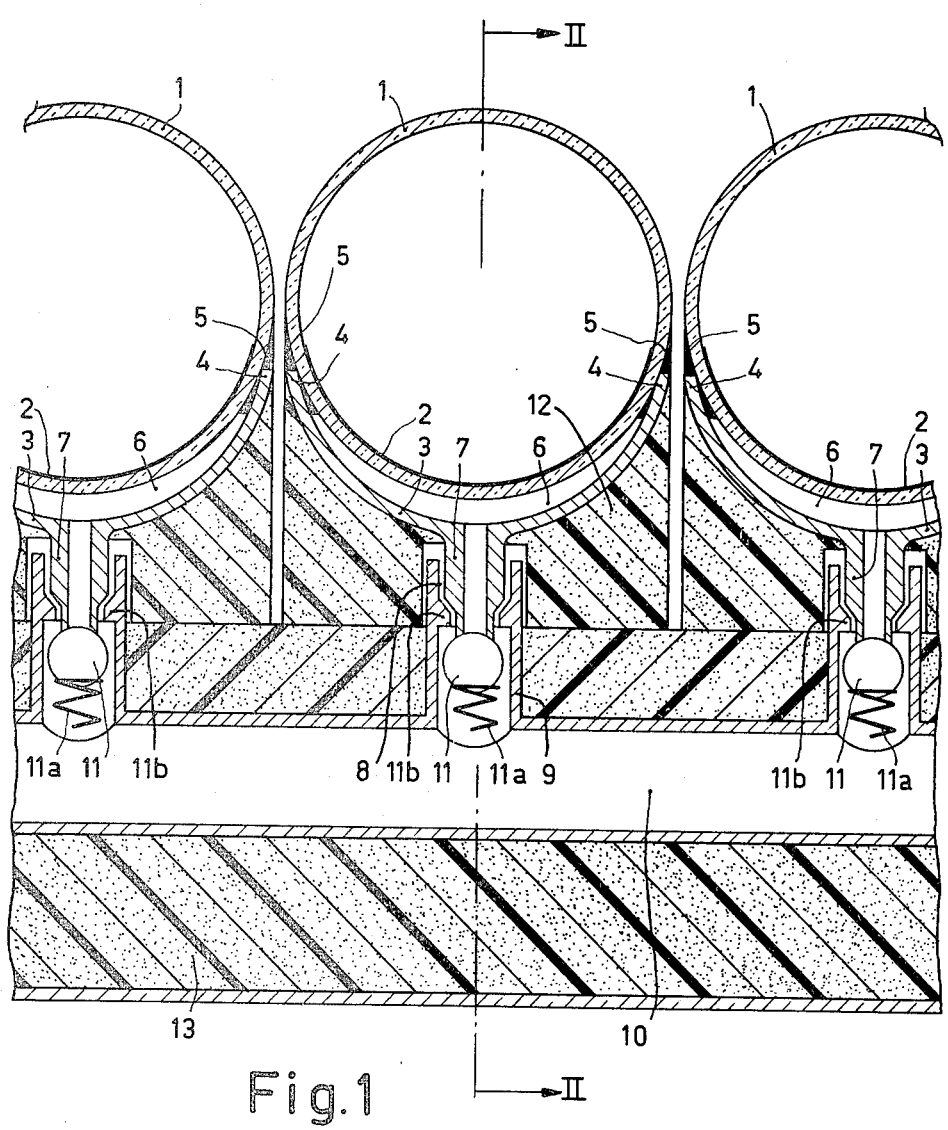
FIG. 1 is a cross-sectional view of a solar collector showing the separate, individual heat exchanger cover tube units.
Figure 2:
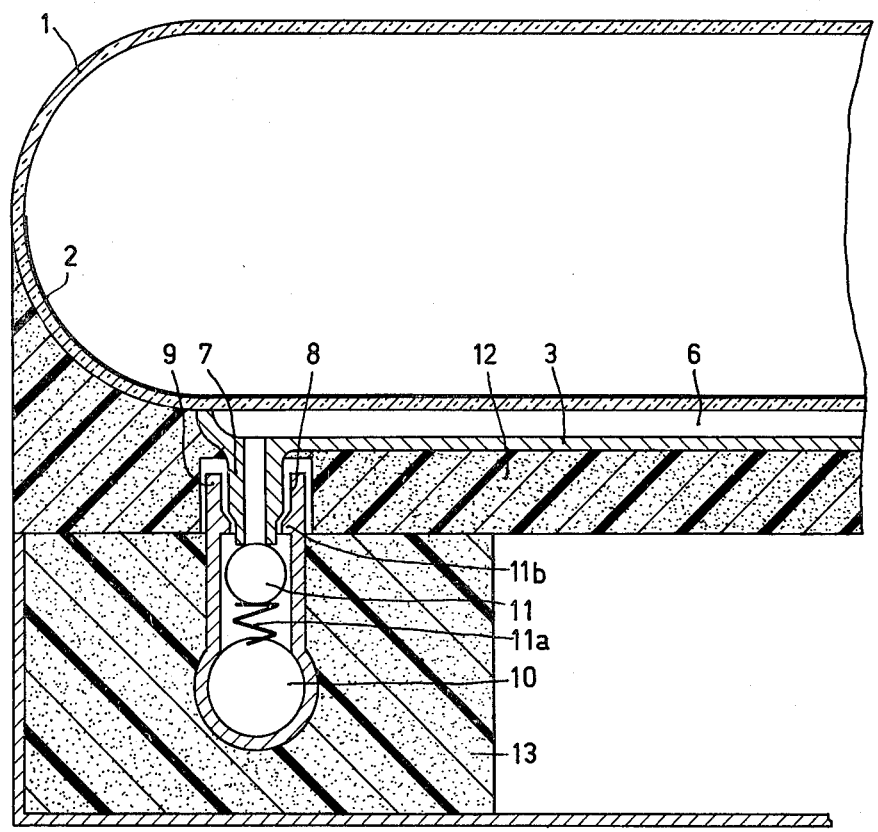
FIG. 2 is a sectional view taken along the line II—II of FIG. 1.

The solar collector shown in FIGS. 1 and 2 comprises several adjacently and closely arranged glass cover tubes 1 which have a circular cross-section, said cover tubes being sealed at their ends and evacuated down to a residual gas pressure of less than 1 mbar. Across the lower half of each tube, the cover tubes 1 are provided internally provided with a selective absorption layer 2 which is made, for example, of nickel or copper oxide on a metal background consisting of, for example, silver, copper or aluminium. Moreover, the inner surface of each cover tube 1 may be covered, either completely or only on the part which is not provided with an absorption layer, with a selective, heat-reflective layer made of, for example, tin-doped indium oxide.

Each cover tube 1 is connected to a trough-shaped body 3 which is preferably made of glass. The upright edges 4 of the trough shaped body 3 are connected to the cover tube 1 by means of an adhesive 5 so that a duct 6 for a heat transport medium, for example, water, is formed between the trough-shaped body 3 and the glass cover tube 1.

The individual trough-shaped bodies 3, constituting heat exchangers in conjunction with the lower parts of the tubes 1, are provided at their respective ends with connection sleeves 7 which are introduced, with insertion of a sealing ring 8, into corresponding connection tubes 9 of an respective inlet and outlet ducts 10 for the heat transport medium. In order to ensure that the heat transport medium cannot flow from the inlet and outlet ducts 10 when the heat exchanger is being replaced, the connection tubes 9 each include non-return valves consisting of a sphere 11, a compression spring 11$a$ and a seat 11$b$. In the situation shown, the sphere 11 remains pressed down by the connection sleeve 7, against the force of the spring 11$a$. When the heat exchanger is removed, the compression spring 11$a$ ensures that the sphere 11 is pressed against the seat 11$b$, so that the connection tube 9 is closed.

The cover tube/heat exchanger units are covered on their respective lower surface by heat insulation 12 consisting of, for example, rock wool or a synthetic foam material. Similarly, the inlet and outlet ducts 10 for the heat transport medium are enclosed by insulating material 13.

In the solar collector shown in FIGS. 1 and 2, the trough-shaped bodies 3 do not envelop the cover tubes 1 over the entire circumference of their respective lower halves, but only over a region of approximately 140°. The adhesive 5 may be provided on the outer side as well as on the inner side against the edges 4 of the trough-shaped bodies 3.

Figure 3:
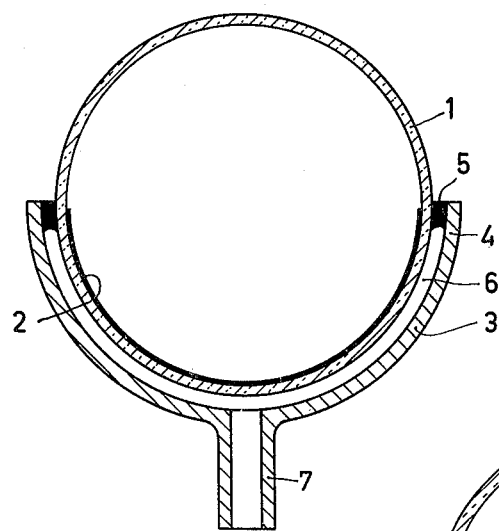
FIGS. 3, 4 and 5 are cross-sectional views of alternative heat exchanger cover tube units.

In the embodiment shown in FIG. 3, the trough-shaped body 3 completely envelops the lower half of the cover tube 1. Therein, the adhesive is provided only between the cover tube 1 and the upright edges 4 of the trough-shaped body 3.

Figure 4:
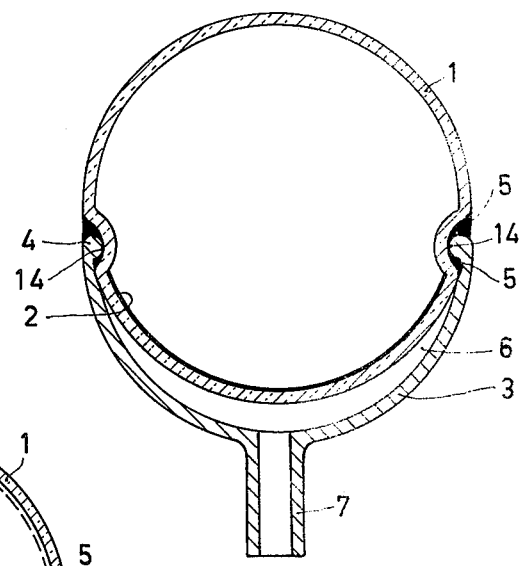

In the embodiment shown in FIG. 4, the cover tube 1 is provided with two longitudinal grooves 14 in which the thickened edges 4 of the trough-shaped body 3 respectively engage, said edges being embedded substantially completely in adhesive 5 therein.

Figure 5:
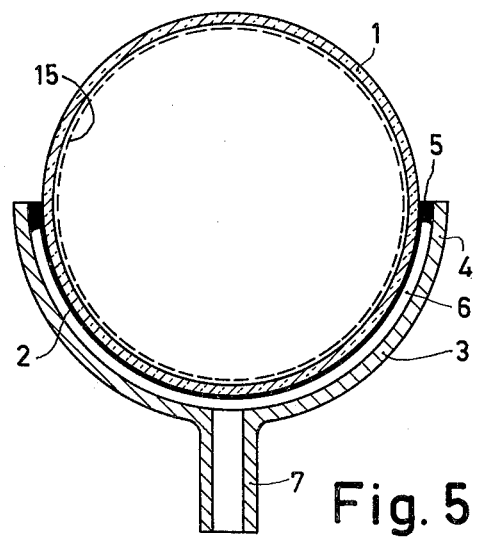

The embodiment shown in FIG. 5 is substantially identical to that shown in FIG. 3. The absorbing layer 2 is now provided on the outer surface of the cover tube 1, inside the duct 6.

Heat transport medium flowing along the absorbing layer 2 in the duct 6 then takes up heat directly from the absorbing layer 2.

The inner surface of the cover tube 1 is covered with a light-transmitting but heat-reflective layer 15 of e.g. $In_2O_3$.

It has been found that a silicone adhesive offers excellent results for the connection of the glass cover tube 1 and the glass trough-shaped body 3.

The trough-shaped body 3 can also be made of a material other than glass, for example, metal or a ceramic material. Moreover, instead of a cross-section in the form of an arc of a circle, it may also be constructed, for example, with a U-profile.

What is claimed is:

1. A solar collector constituted of one or more individual heat exchanger unit each comprising a body provided with a trough; a sealed and evacuated transparent cover tube in contact with said trough, said cover tube and said trough being of complementary shape and forming a heating duct therebetween; an absorber associated with the cover tube adjacent the heating duct and serving to transfer heat derived from incident solar radiation during operation to a heat-transport medium fed through the heating duct; means to seal the cover tube to the trough along and adjacent to their line of contact; a heat-transport medium inlet duct and a heat-transport medium outlet duct respectively positioned in the vicinity of the cover tube ends; connection tubes respectively extending from said inlet duct and said outlet duct; and corresponding connection sleeves extending from the respective ends of said heating duct for removable reception by said connection tubes.

2. A solar collector according to claim 1, in which the connection tubes are each provided with a non-return valve for closing the connection tubes upon removal of the heat exchanger unit from the inlet duct and the outlet duct.

3. A solar collector according to claim 1 or 2, in which the absorber is provided in the form of a layer on the outer surface of the cover tube within the heating duct.

4. A solar collector according to claim 1 or 2, in which the inner surface of the cover tube is provided with a light-transmitting but heat-reflective layer.

* * * * *